United States Patent [19]

Allen et al.

[11] Patent Number: 4,623,370
[45] Date of Patent: Nov. 18, 1986

[54] GAS TREATMENT PROCESS

[75] Inventors: Peter Allen, Johannesburg; John W. Hemmings, Randburg, both of South Africa

[73] Assignee: Aeci Limited, Johannesburg, South Africa

[21] Appl. No.: 770,786

[22] Filed: Aug. 29, 1985

[30] Foreign Application Priority Data

Sep. 11, 1984 [ZA] South Africa .................. 84/7140

[51] Int. Cl.⁴ .............................................. F25J 3/00
[52] U.S. Cl. .................................... 62/11; 55/68; 62/17; 62/22; 62/24; 62/62
[58] Field of Search ............... 62/9, 11, 17, 22, 24, 62/32; 55/66, 68; 203/42, 43

[56] References Cited

U.S. PATENT DOCUMENTS

| | | | |
|---|---|---|---|
| 2,940,269 | 6/1960 | Franier | 62/11 |
| 2,946,200 | 7/1960 | Schilling | 62/22 |
| 3,098,732 | 7/1963 | Dennis | 62/9 |
| 3,407,613 | 10/1968 | Muller et al. | 62/11 |
| 3,807,185 | 4/1974 | Forg et al. | 62/22 |
| 3,886,756 | 6/1975 | Allam et al. | 62/17 |
| 4,057,407 | 11/1977 | Biel | 62/22 |
| 4,149,864 | 4/1979 | Eakman et al. | 62/11 |
| 4,235,613 | 11/1980 | Castoe et al. | 55/68 |
| 4,305,733 | 12/1981 | Scholz et al. | 62/17 |
| 4,338,107 | 7/1982 | Swallow | 62/24 |
| 4,338,108 | 7/1982 | Isalski et al. | 62/22 |
| 4,428,759 | 1/1984 | Ryan et al. | 62/17 |
| 4,557,735 | 10/1985 | Pike | 55/68 |

FOREIGN PATENT DOCUMENTS

| | | |
|---|---|---|
| 859747 | 10/1977 | Belgium . |
| 0119001 | 2/1984 | European Pat. Off. . |
| 2814660 | 10/1979 | Fed. Rep. of Germany . |
| 2073863 | 11/1983 | United Kingdom . |

Primary Examiner—Ronald C. Capossela
Attorney, Agent, or Firm—Cushman, Darby & Cushman

[57] ABSTRACT

In a gas treatment process, a liquid tail product from a nitrogen wash column, which is typically incorporated into a process for the manufacture of ammonia from hydrocarbons, coal or other carbonaceous material, is separated in cryogenic distillation columns into product streams. Streams rich in hydrogen and carbon monoxide are available at elevated pressure and may be beneficially recycled to the ammonia manufacturing process. The process requires no external source of refrigeration and no compressor is incorporated therein. A stream of liquid nitrogen, which may typically be available in an ammonia manufacturing plant, may optionally be used and, when used, will result in improved separation in the distillation columns.

12 Claims, 4 Drawing Figures

GAS TREATMENT PROCESS

This invention relates to a gas treatment process.

The Applicant is aware of a chemical process which includes a reaction stage wherein a gaseous stream obtained, for example, during the gasification of coal or partial oxidation of hydrocarbons, and typically comprising carbon monoxide (CO), carbon dioxide ($CO_2$), hydrogen ($H_2$) and impurities such as argon (Ar), methane ($CH_4$), hydrogen sulphide ($H_2S$) and nitrogen ($N_2$), is subjected to a water gas shift reaction. In this reaction, CO reacts with $H_2O$ to form $CO_2$ and $H_2$. The $CO_2$ and $H_2$ produced are withdrawn from the reaction stage together with the unreacted CO and impurities, as a gas stream. The gas stream is subjected to gas treatment which includes a $CO_2$- and $H_2S$-removal stage. In the $CO_2$- and $H_2S$-removal stage, $CO_2$ and $H_2S$ are separated from the other gaseous components, and a composite gas feed stream comprising the remaining components ($H_2$, Ar, $N_2$, $CH_4$ and CO) is fed into a nitrogen wash stage. In the nitrogen wash stage the gas is contacted with liquid or supercritical nitrogen. CO and Ar together with the impurities and some $H_2$ are dissolved or absorbed into the liquid nitrogen stream to produce a liquid tail products stream containing $N_2$, CO, $H_2$, Ar, $CH_4$. Such a nitrogen wash stage is normally operated at a pressure between 1000 and 12,000 kPa and at a temperature determined by vapour-liquid equilibrium at the operating pressure. An $H_2$ and $N_2$ gaseous overheads stream from the nitrogen wash stage is normally fed to an ammonia synthesis stage. The tail products stream is usually discarded or used as a fuel. This process hence has the drawback that it is wasteful, ie valuable chemicals in the tail products stream are lost.

It is an object of this invention to provide a gas treatment process for treating such a composite gas feed stream, whereby this drawback is at least reduced.

According to a first aspect of the invention, there is provided a gas treatment process which includes passing a composite gas feed stream comprising $H_2$, $N_2$, CO and impurities such as Ar and, optionally, $CH_4$, at super-atmospheric pressure and at sub-ambient temperature into a nitrogen wash zone;

simultaneously introducing liquid nitrogen into the nitrogen wash zone;

withdrawing an $H_2$-rich stream from the nitrogen wash zone;

withdrawing a liquid tail product stream comprising $N_2$, CO, the impurities and some $H_2$ from the nitrogen wash zone;

separating at least a portion of the liquid tail product stream into a plurality of product streams in a plurality of cryogenic distillation zones, each product stream being rich in one or more of $H_2$, CO, $N_2$ and at least one impurity;

withdrawing from at least one of the distillation zones a gaseous overheads stream;

cooling down the gaseous overheads streams thereby at least partially condensing them;

separating each cooled overheads stream into at least first and second overheads streams;

returning the first overheads streams to their associated distillation zones as reflux streams;

withdrawing from at least two of the distillation zones a liquid bottoms stream;

heating at least part of each of the bottoms stream thereby at least partially vapourizing it; and returning at least a portion of each vapourized bottoms stream to its associated zone as a reboil stream, the heating up of each of the bottoms streams and the cooling down of each of the overheads streams being effected at least partially by heat exchange with an overheads and/or a bottoms and/or the composite gas feed and/or the liquid tail product stream, and none of the gaseous overheads streams being subjected to further compression prior to separating them into the first and second streams.

The process may include feeding the liquid tail product stream into a flash zone which is at a lower pressure than the nitrogen wash zone;

withdrawing an $H_2$-rich stream from the flash zone at a high level;

withdrawing a liquid stream comprising $N_2$, CO, impurities and residual $H_2$ from the flash zone at a low level, as said portion of the liquid tail product stream which is separated into the plurality of product streams.

The process may also include utilizing the liquid stream from the flash zone to cool down the feed stream prior to it entering the nitrogen wash zone.

The pressure in the nitrogen wash zone may be between 1500 and 12,000 kPa(a), that in the flash zone may be at least 500 kPa(a). The temperature in the nitrogen wash zone may be less than 100 K. Hence, the pressure in the flash zone may be between 500 and 1500 kPa(a). Hereinafter, in this specification, unless otherwise indicated, pressures are given in absolute values.

The gas feed stream may be that of a chemical process as hereinbefore described.

The process may include utilizing also the $H_2$-rich stream from the nitrogen wash zone and/or the $H_2$-rich stream from the flash zone, to cool the feed stream to the nitrogen wash zone.

In one embodiment, the distillation zones may comprise a first distillation zone from which a gaseous overhead stream comprising mainly CO, $N_2$ and $H_2$, as well as a liquid bottom stream comprising mainly CO, Ar and $CH_4$ are withdrawn; and second and third interconnected distillation zones, the second zone being located above the third zone in a single distillation column, at least portions of the overheads and bottom streams from the first zone both being fed as feed streams to the distillation column, and a gaseous overheads product stream rich in $N_2$, an intermediate liquid stream product rich in CO, and a bottoms product stream rich in impurities, being withdrawn from the column.

The bottoms stream from the first zone may be fed into the third zone. The second overheads stream from the first zone comprises mainly gaseous components and the first overhads stream mainly condensate, the second overheads stream constituting the portion of the overheads stream from the first zone which is fed to the second zone of the column.

The cooling and partial condensation of the overheads stream from the first zone may be effected by heat exchange with said part of the bottoms stream from the third zone.

The heating up of said at least part of the bottoms stream from the first zone may be effected by heat exchange with the feed stream to the nitrogen wash zone, thereby to assist in cooling down the feed stream.

It is a feature of the process of the invention that no compression, eg as part of a refrigeration step, of any gaseous stream withdrawn from any of the zones is required. This is brought about by the integration of the zones of the process. In other words, the streams to and from the various zones are subjected to heat exchange with one another in such a fashion that no gas compression is required. The Applicant believes that this has substantial advantages, eg no compressor capital expenditure, which is usually substantial is required; compressor maintenance and power costs, which are usually high, are avoided; no refrigeration system, and its associated costs, is required, etc.

An additional feature of the process of the invention is that streams rich in $H_2$ and CO are obtained at elevated pressure, which reduces the costs associated with processing these streams further, eg recycling them to an ammonia plant.

In another embodiment, the distillation zones may comprise a first distillation zone from which a gaseous overhead stream comprising mainly CO, $N_2$ and $H_2$, as well as a liquid bottoms product stream comprising mainly impurities, are withdrawn; and a second distillation zone to which at least a portion of the overheads stream from the first distillation zone is fed, a gaseous overheads product stream rich in $H_2$ and $N_2$, and a liquid bottoms product stream rich in CO being withdrawn from the second distillation zone.

In yet another embodiment, the distillation zones may comprise a first distillation zone from which a gaseous overheads product stream rich in $H_2$ and $N_2$, as well as a liquid bottoms stream rich in CO and impurities, are withdrawn, and a second distillation zone to which the bottoms stream from the first zone is fed, a gaseous overheads product stream rich in CO and a liquid bottoms product stream rich in impurities being withdrawn from the second distillate zone.

The process may include cooling and partially condensing the product stream rich in $H_2$ and $N_2$, and separating an $N_2$-rich liquid from an $H_2$-rich vapour.

According to a second aspect of the invention, there is provided a gas treatment process which includes passing a composite gas feed stream comprising $H_2$, $N_2$, CO and impurities such as Ar and, optionally, $CH_4$, at super-atmospheric pressure and at sub-ambient temperature into a nitrogen wash zone;

simultaneously introducing liquid nitrogen into the nitrogen wash zone;

withdrawing an $H_2$-rich stream from the nitrogen wash zone;

withdrawing a liquid tall product stream comprising $N_2$, CO, the impurities and some $H_2$ from the nitrogen wash zone;

separating at least a portion of the liquid tail product stream into a plurality of product streams in a plurality of cryogenic distillation zones, each product stream being rich in one or more of $H_2$, CO, $N_2$ and at least one impurity;

withdrawing from a first distillation zone a gaseous overheads stream;

withdrawing from a second distillation zone a liquid bottoms stream;

passing the overheads stream and the bottoms stream through a heat exchanger, thereby cooling down the gaseous overheads stream and at least partially condensing it, and simultaneously heating the bottoms stream and at least partially vapourizing it;

returning at least some of the condensate of the overheads stream to the first distillation zone as a reflux stream; and returning at least a portion of the vapourized bottoms stream to the second distillation zone as a reboil stream.

According to a third aspect of the invention, there is provided a gas treatment process which includes passing a composite gas feed stream comprising $H_2$, $N_2$, CO and impurities such as Ar and, optionally, $CH_4$, at super-atmospheric pressure and at sub-ambient temperature into a nitrogen wash zone;

simultaneously introducing liquid nitrogen into the nitrogen wash zone;

withdrawing an $H_2$-rich stream from the nitrogen wash zone;

withdrawing a liquid tail product stream comprising $N_2$, CO, the impurities and some $H_2$ from the nitrogen wash zone;

feeding the liquid tail product stream into a flash zone which is at a lower pressure than the nitrogen wash zone;

withdrawing an $H_2$-rich gaseous stream from the flash zone;

withdrawing a liquid stream comprising $N_2$, CO, impurities and residual $H_2$ from the flash zone;

separating the liquid stream from the flash zone into a plurality of product streams in a plurality of cryogenic distillation zones, each product stream being rich in one or more of $H_2$, CO, $N_2$ and at least one impurity; and utilizing the liquid stream from the flash zone to cool down the feed stream prior to it entering the nitrogen wash zone.

The invention will now be described by way of example with reference to the accompanying block diagrams.

Figure 1:
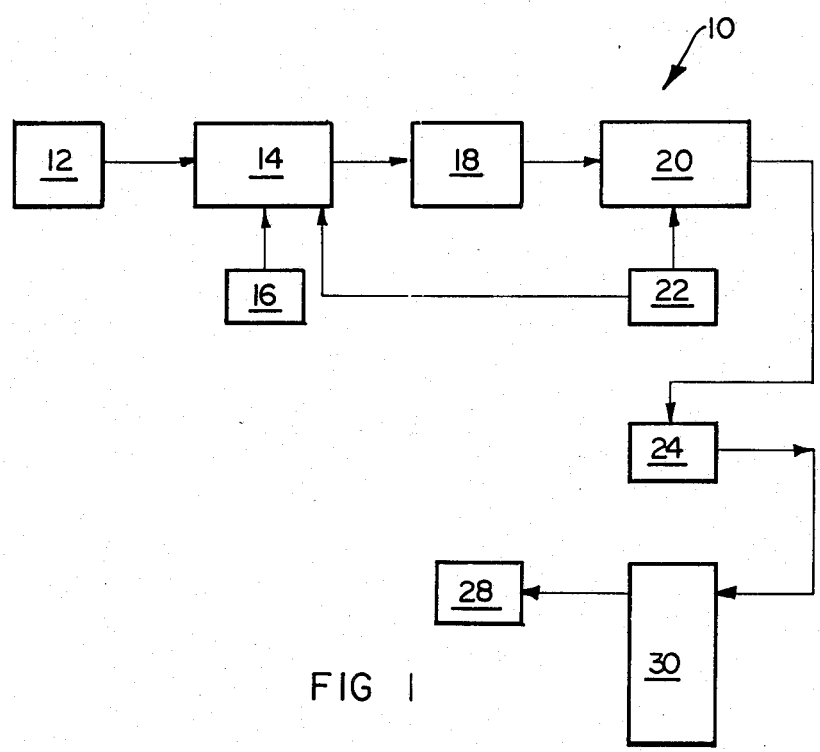
FIG. 1 shows a block flow diagram of a chemical process incorporating, as a stage in the chemical process, a gas treatment process according to the invention.
Figure 2:
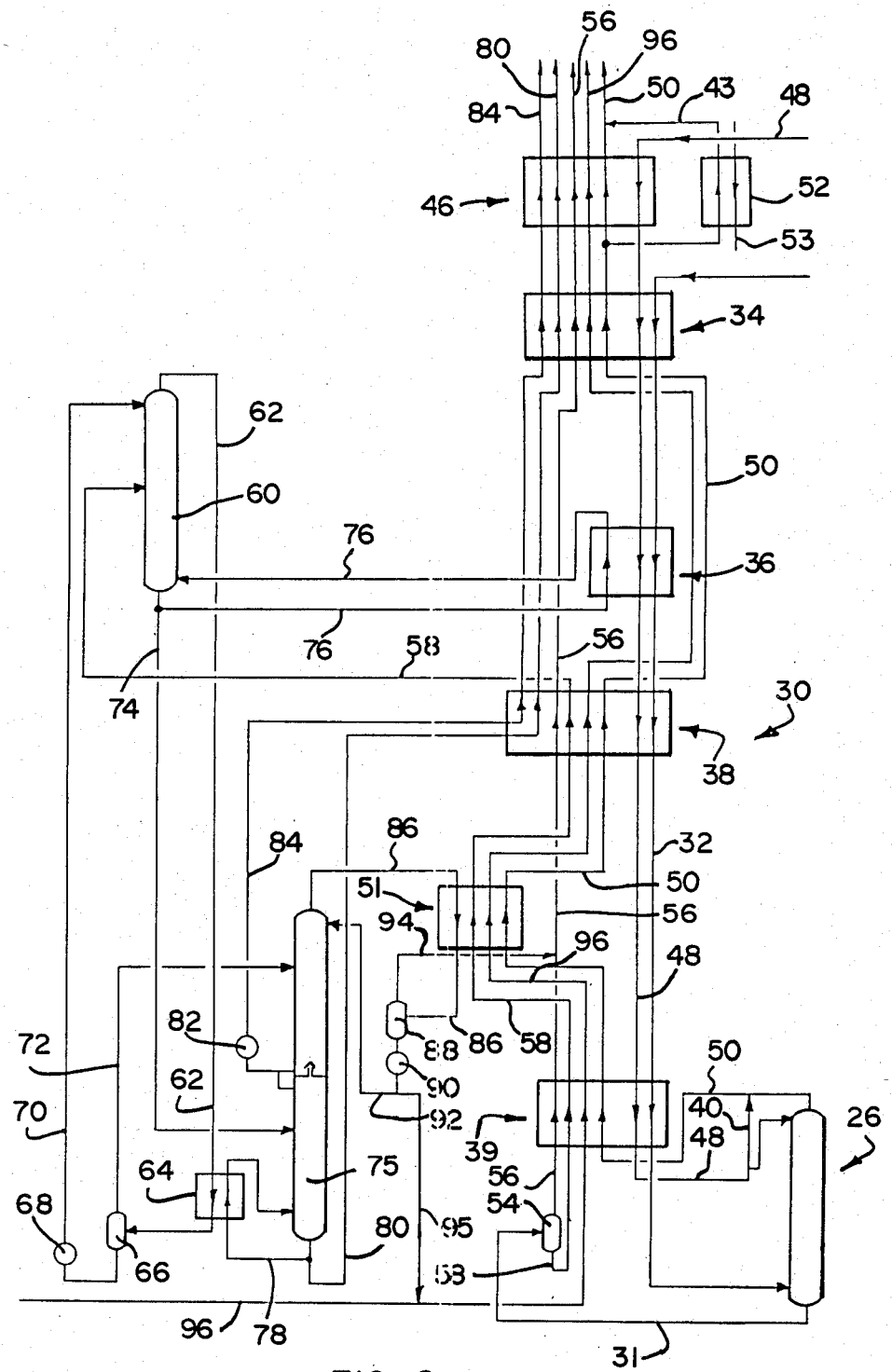
FIG. 2 shows, in more detail, a flow diagram of the gas treatment stage of FIG. 1.

Referring to FIGS. 1 and 2, reference numeral 10 generally indicates a block diagram of a chemical process.

The process 10 includes a coal preparation stage or plant 12 where coal is suitably prepared (eg comminuted or pulverized and dried) for further processing. The process 10 also includes a coal gasification stage or plant 14 which receives coal from the stage 12, as well as oxygen from an oxygen-generating stage 16 and steam from a stream generating stage 22. In the stage 14 the coal is gasified, eg in Koppers-Totzek (trade name) gasifiers, and a synthesis gas comprising CO, $CO_2$, $H_2$, $N_2$ and other impurities, such as Ar and $CH_4$, passes to a treating stage or plant 18 where the gas is compressed and purified, eg desulphurized by scrubbing with methanol in a Rectisol (trade name) unit. Thereafter, the gas is compressed further and passes to a water gas shift reaction stage 20 together with steam from the steam generating stage or plant 22. In the stage 20, CO and $H_2O$ combine or are shifted to give $CO_2$ and $H_2$ by means of the water gas shift reaction. A product gas comprising $H_2$, $CO_2$, $N_2$, CO (usually 3–5% by volume), Ar and $CH_4$ is fed to a $CO_2$ removal stage 24 where essentially all of the $CO_2$ is removed, eg by absorption into methanol at $-59°$ C. in a Rectisol (trade name) unit, and further absorption onto beds of molecular sieves. A product stream comprising mainly $H_2$ as well as $N_2$, Ar, CO and $CH_4$, from the stage 24, passes to a gas treatment stage 30, at a temperature of about $-46°$ C. In the stage 30, the gas is, inter alia, washed by means of a liquid nitrogen wash, ie a cyrogenic scrubbing, in a zone or column 26, as described in more detail hereinafter. The liquid nitrogen absorbs or dissolves essentially all of the CO, Ar and $CH_4$, as well as a small amount of the $H_2$. An overheads gas stream comprising $H_2$ and $N_2$ passes from the stage 26 to an ammonia synthesis plant or unit 28, which requires a $H_2:N_2$ molar ratio of 3:1. Where the ammonia synthesis unit has a synthesis loop which is not provided with a purge stream to control the level of inerts in the loop, Ar and $CH_4$ must not be present in the feed to the unit 28. This is achieved in the stage 30, which is described in more detail hereunder. It is also critical that the feed stream does not contain more than 5 ppm CO since values higher than this will reduce catalyst life in the ammonia synthesis plant.

The gas from the stage 24 is fed into the bottom of the column 26 via a flow line 32. The flow line 32 passes through multistream heat exchangers 34, 36, 38 and 39, in which the gas is cooled down to a temperature of about 82 K., at which temperature it enters the column 26.1.

High pressure $N_2$ (at a pressure of about 5000 kPa), is fed into the top of the column 26 by means of a flow line 48. Prior to entering the column 26 it passes through a multistream heat exchanger 46 as well as through the multistream heat exchangers 34, 36, 38 and 39, in which the nitrogen is cooled to a temperature of about 82 K. and liquefied. The liquid $N_2$ flows down the column, thereby effecting counter current scrubbing of the gas moving up the column and absorbing the impurities into it.

The nitrogen wash column 26 operates at a pressure of about 4300 kPa, and at a temperature of about 81 K. It may be a sieve tray column. If desired, the gas feed to the column 26 can be pretreated to ensure removal of impurities which could solidify and deposit on downstream items of equipment.

It is desirable to operate the absorption or wash column 26 at as low a temperature as possible to minimize the volume of liquid $N_2$ required, eg the solubility of CO in liquid $N_2$ increaases with decreasing liquid $N_2$ temperature.

The minimum expected operating temperature of the column 26 is about $-194°$ C.

The liquid nitrogen used in column 26 can be obtained from any desired external source, ie a source outside the stage 30. For example, it may be obtained by cooling and liquefying $N_2$ gas in the heat exchangers by counter current heat exchange with the cold product streams, as described in more detail hereinafter.

A gas stream comprising mainly $H_2$, but including some $N_2$ (eg up to 10% by volume) and less than 5 ppm CO, passes from the top of the column 26 via a flow line 50. A stream of $N_2$ is bled into it via a flow line 40 coming from the flow line 48 to adjust the molar $H_2:N_2$ ratio to 3:1. This stream of $N_2$ constitutes about 70–75% of the total liquid $N_2$ from the exchanger 39. A high $H_2$ recovery is effected, eg up to 99%. The flow line 50 passes through a multistream heat exchanger 51 as well as through the multistream heat exchangers 39, 38, 36, 34 and 46, where the gas is heated up to about ambient temperature, eg about 293 K. It then passes to the ammonia synthesis unit 28. The gas to the unit 28 contains acceptable levels, ie trace quantities only, of CO, Ar and $CH_4$. A portion of this gas stream by-passes the heat exchanger 46, and is fed, via a flow line 43, through a further heat exchanger 52 where it provides a cold utility for the $CO_2$ removal stage 24, ie it exchanges heat with a stream 63 from or in the stage 24. This gas split can be varied to suit heat balance requiements in the stage 30.

A liquid tail products stream is withdrawn from the bottom of the column 26 and is fed via a flow line 31 and across an expansion valve (not shown), into a flash vessel 54 which operates at a pressure of about 1500 kPa, and at a temperature of about 83 K. In the vessel 54, a $H_2$ rich stream is separated off from the remaining liquid. The $H_2$ rich stream passes from the vessel 54 via a flow line 56, through a pressure control valve across which it is expanded to about 500 kPa, through the heat exchangers 39, 38, 34 and 46, where it is heated to about 293 K., and is thereafter withdrawn from the stage 30 for further processing, eg by recycle to stage 18 (not shown).

The liquid product in the vessel 54 passes as a stream comprising mainly CO, Ar, $N_2$ and smaller amounts of $H_2$ and $CH_4$ from the vessel, via a flow line 58. The flow line 58 passes through the heat exchangers 39, 51 and 38, where the stream is heated (by heat exchange with the incoming gas feed stream and the gaseous $N_2$ stream to the column 36) to a temperature of about 113 K., thereby partially vapourizing it, into a high pressure distillation column 60 providing a first distillation zone of a gas recovery system.

The condensation of the incoming gaseous $N_2$ at high pressure, the expansion of the liquid tail products stream, and the vapourisation of the liquid product from the flash vessel 54 constitutes a refrigeration heat pump and provides the driving force for the process. Hence, no compression of any gaseous stream is required in the stage 30. Furthermore, the partial pressure of $N_2$ in the product gas stream to the stage 30 is about one-third that of the high pressure $N_2$ stream. The reduction in partial pressure absorbs heat by means of the Joule Thompson effect, thereby assisting the refrigeration heat pump.

The distillation column 60 operates at a pressure of about 1500 kPa, and a temperature of about 114 K.

An Ar-poor gaseous overheads stream comprising mainly $N_2$, CO and $H_2$ is withdrawn from the top of the column 60, and passes, via a flow line 62, through a heat exchanger 64, where it is cooled (and partially condensed) to a temperature of about 112 K., and into a vessel 66, operating at a temperature of about 112 K. and a pressure of about 1500 kPa. The liquid fraction from the vessel 66 is pumped, by means of a pump 68 and a flow line 70, back into the top of the column 60 (and hence provides a reflux stream for the column 60).

The gaseous fraction comprising $N_2$, CO and $H_2$, from the vessel 66 passes, by means of a flow line 72, into an upper zone or section of a distillation column 75, the operation of which will be described in more detail hereunder.

The $N_2$-poor liquid bottoms stream from the column 60, comprising mainly CO, Ar and $CH_4$, is split into two streams passing along flow lines 74, 76, respectively. The flow line 76 passes through the heat exchanger 36 where the stream is partially vaporized at about 117 K., and is returned to the bottom of the column 60. Hence, the contents of the flow line provide a re-boil stream for the column 60.

The flow line 74 enters a lower zone or section of the distillation column 75 as a two-phase feed.

The distillation column 75 comprises said upper and lower sections, and operates at a pressure of about 800 kPa. The operating temperature at the top of the column is about 99 K., and at the bottom the column it is about 111 K. The upper section acts as a condenser for the lower section whose operation is determined by the flow of 'reflux' let down from the upper section. Hence, the lower section can be regarded as a column which produces a CO-rich top product and an Ar-rich bottoms product, while the upper section can be regarded as a column which produces a CO-rich bottoms product and a $N_2$-rich top product which also contains a significant amount of $H_2$.

A liquid bottoms product stream, comprising mainly Ar and $CH_4$, is withdrawn from the bottom of the column 75 and is immediately split into two streams. The one stream passes, via a flow line 78, through the heat exchanger 64, where it is partially vapourized at a temperature of about 111 K., and it is then returned to the bottom of the column 75. Hence it constitutes a re-boil stream. The other bottoms stream passes, via a flow line 80, through the heat exchangers 38, 34 and 46 and is withdrawn from the stage 30 for further processing. The Ar rich stream purity will be in the range of 70-100%, and the stream can be further purified to obtain a saleable Ar product, in a further processing stage (not shown).

Hence, the operating pressures of the columns 60, 75 are such that the condenser 64 of the high pressure column 60 acts as reboiler for the lower pressure column 75.

The combined reboiler/condenser 64 permits the gas recovery system, provided by the distillation columns 60, 75 to utilize the large temperature difference which exists between the hot and cold streams in the heat exchanger bank or column comprising the exchangers 38, 51, 38, 34 and 46. Hence, the energy required to operate the columns 60, 75 is provided by the process itself, with no additional hot or cold utility being required for the distillation columns.

The pressure in column 60 need not necessarily be controlled, but can be regulated stably by the relative sizes and heat transfer efficiencies of the heat exchangers 36, 64.

A liquid intermediate product stream, comprising mainly CO, is withdrawn from the column 75 at a point where its two sections meet, eg from a chimney tray located in the centre of column 75, is pumped to a pressure of 6000 kPa by a pump 82 and is transferred via a flow line 84, through the heat exchangers 38, 34 and 46, where it is heated to a temperature of about 293 K. and vapourized. Is is then withdrawn from stage 30 and is recycled to stage 20 (not shown). In another embodiment (not shown) the CO stream can instead leave the stage 30 at a lower pressure, for example 800 kPa.

A gaseous product stream, comprising mainly $N_2$ and $H_2$, is withdrawn from the top of the column via a flow line 86 which passes through the heat exchanger 51 where the stream is partially condensed at a temperature of about 99 K. The stream then passes into a reflux drum 88. In the drum 88, $H_2$ gas is separated from the liquid and is withdrawn from the top of the drum 88 via a flow line 94. A liquid stream is pumped from the drum 88 via a pump 90 and a flow line 92, back into the top of the column 75, and hence constitutes a reflux stream for the column 75. A second liquid stream is let down across a valve (not shown) and is bled via a flow line 95 into flow line 96 before flow line 96 passes through the heat exchanger 39. The pressure of the vapour stream in the flow line 94 is reduced, whereafter the flow line 94 joins the flow line 56.

A relatively small volume of liquid nitrogen, as cold utility, is bled into the stage 30 by means of a flow line 96. The flow line 96 passes through the heat exchanger 39, 51, 38, 34 and 46, where it is heated to a temperature of about 293 K. by heat exchange with, inter alia, the incoming feed stream to the column 26. Thereafter, it is withdrawn from the stage 30. In another embodiment (not shown), the cold utility liquid $N_2$ can be dispensed with, eg when the stage 30 operates at a high pressure such as above 7000 kPa. In any event, it is expected that the heat removal effected by the cold utility (when used) will not be substantial, eg less than 5% of the total heat removed from the feed stream to the $N_2$ wash column 26.

The Applicant believes that, with the separation stage 30, useful components can be recovered from the product stream from the $CO_2$ removal stage 24, at suitable purities for re-use, eg in the ammonia synthesis stage or plant 28.

The heat exchangers 51, 36 and 64 associated with the distillation columns 75 and 60 are integrated into the process in such a way that only a very small volume, if any, of cold utility is required to satisfy the heat balance of the process. The requirement for cold utility is comparable to that of a standard Nitrogen wash stage or unit in which the tail products stream is discarded after heat exchange. As mentioned hereinbefore, no refrigeration stage or unit need be employed, which has substantial advantages, as also mentioned hereinbefore.

Hence, the stage 30 is more-or-less thermally self-supporting since only a relatively small amount of energy from an external source (ie external cold utility) is required to satisfy the heat balance of the process, ie the stage is thermally efficient.

Furthermore, in the stage 30 a process stream rich in Ar, is recovered, and this can be processed further, if desired (not shown).

The various items of equipment can be thermally insulated, eg one or more of the items can be encapsulated in a container (not shown) packed with slag wool insulation and maintained at a slight positive pressure with $N_2$, to prevent air entering the container. If air is present, water vapour therein could condense and freeze. Furthermore, the $N_2$ flow acts as a purge.

The heat exchangers may be plate fin heat exchangers.

Figure 3:
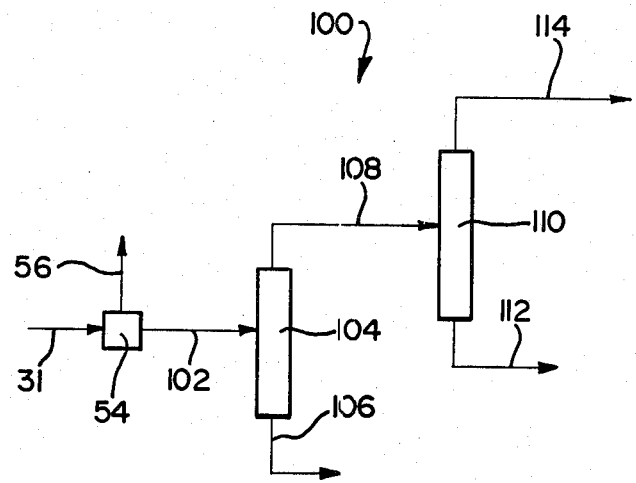
FIG. 3 shows a block flow diagram, in simplified form, of another gas treatment stage for use with the chemical process of FIG. 1.

Referring to FIG. 3, reference numeral 100 generally indicates a gas treatment stage according to another embodiment of the invention. In FIG. 3 heat exchanger details are not shown but they are of a generally similar nature to those of stage 30.

Parts of the stage 100 which are the same or similar to those of the stage 30 hereinbefore described with reference to FIGS. 1 and 2, are indicated with the same reference numerals.

The stage 100 includes a flash vessel 54. The liquid product from the flash vessel 54 passes, via a flow line 102, into a distillation column 104. A bottoms product stream, rich in Ar and containing $CH_4$, is withdrawn from the distillation column 104 via a flow line 106. A gaseous overhead stream containing $N_2$, CO, $H_2$ with some Ar is withdrawn from the top of the colum 104 via a flow line 108 and is fed into a distillation column 110.

A bottoms product stream, rich in CO, is withdrawn from the bottom of the column 110 via a flow line 112. An overheads product stream, comprising mainly $N_2$ and $H_2$ with some CO, is withdrawn from the top of the column 110 via a flow line 114.

Heat exchangers associated with the distillation columns for stage 100 are integrated in such a way that utility requirements for stage 100 are similar to those of stage 30. Ar recovery potential is similar to that of stage 30.

Figure 4:
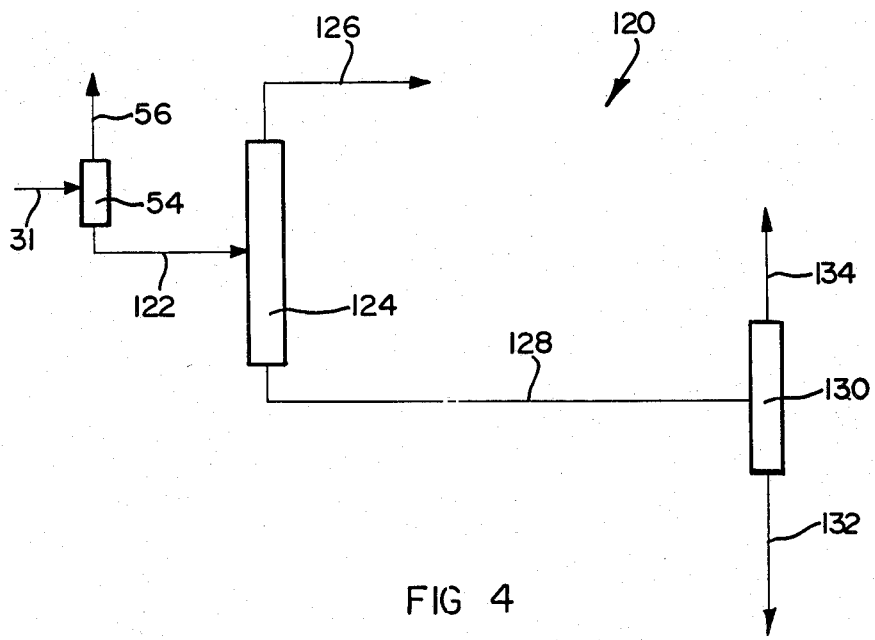
FIG. 4 shows a block flow diagram, in simplified form, of yet another gas treatment stage for use in the process of FIG. 1.

Referring to FIG. 4 of the drawings, reference numeral 120 indicates a gas treatment stage according to yet another embodiment of the invention. Heat exchanger details are not shown but are similar in principle to those of stage 30.

Parts of the stage 120 which are similar to those of the stage 30 and 100 hereinbefore described with reference to FIGS. 1, 2 and 3, are indicated with the same reference numerals.

The liquid product from the vessel 54 is fed, via a flow line 122, into a distillation column 124. An overheads product stream, comprising mainly $H_2$ and $N_2$ is withdrawn from the top of the column 124 via a flow line 126.

The liquid bottoms product from the distillation column 124 containing mainly CO and Ar together with some $N_2$ and $H_2$ is withdrawn and fed via a flow line 128 into a further distillation column 130. A bottoms product stream, comprising mainly Ar, is withdrawn from the distillation column 130 via a flow line 132, and an overheads product stream, comprising mainly CO, is withdrawn from the top of the column 130 via a flow line 134.

Heat integration is such that the cold utility requirements for stage 120 is comparable to that of stage 30. The potential of Ar recovery is also similar.

We claim:

1. A gas treatment process which includes
    passing a composite gas feed stream comprising $H_2$, $N_2$, CO and impurities such as Ar and, optionally, $CH_4$, at super-atmospheric pressure and at sub-ambient temperature into a nitrogen wash zone;
    simultaneously introducing liquid nitrogen into the nitrogen wash zone;
    withdrawing an $H_2$-rich stream from the nitrogen wash zone;
    withdrawing a liquid tail product stream comprising $N_2$, CO, the impurities and some $H_2$ from the nitrogen wash zone;
    separating at least a portion of the liquid tail product stream into a plurality of product streams in a plurality of cryogenic distillation zones, each product stream being rich in one or more of $H_2$, CO, $N_2$ and at least one impurity;
    withdrawing from at least two of the distillation zones a gaseous overheads stream;
    cooling down the gaseous overheads streams thereby at least partially condensing them;
    separating each cooled overheads stream into at least first and second overheads streams;
    returning the first overheads streams to their associated distillation zones as reflux streams;
    withdrawing from at least two of the distillation zones a liquid bottoms stream;
    heating at least part of each of the bottoms stream thereby at least partially vapourizing it; and
    returning at least a portion of each vapourized bottoms stream to its associated zone as a reboil stream, the heating up of each of the bottoms streams and the cooling down of each of the overheads streams being effected at least partially by heat exchange with an overheads and/or a bottoms and/or the composite gas feed and/or the liquid tail product stream, and none of the gaseous overheads streams being subjected to further compression prior to separating them into the first and second streams.

2. A process according to claim 1, which includes
    feeding the liquid tail product stream into a flash zone which is at a lower pressure than the nitrogen wash zone;
    withdrawing an $H_2$-rich stream from the flash zone at a high level;
    withdrawing a liquid stream comprising $N_2$, CO, impurities and residual $H_2$ from the flash zone at a low level, as said portion of the liquid tail product stream which is separated into the plurality of product streams; and
    utilizing the liquid stream from the flash zone to cool down the feed stream prior to it entering the nitrogen wash zone.

3. A process according to claim 2, wherein the pressure in the nitrogen wash zone is between 1500 and 12,000 kPa(a), that in the flash zone is at least 500 kPa(a), and the temperature in the nitrogen wash zone is less than 100 K.

4. A process according to claim 2, which includes utilizing also the $H_2$-rich stream from the nitrogen wash zone and/or the $H_2$-rich stream from the flash zone, to cool the feed stream to the nitrogen wash zone.

5. A process according to claim 1, wherein the distillation zones comprise
    a first distillation zone from which a gaseous overheads stream comprising mainly CO, $N_2$ and $H_2$, as well as a liquid bottom stream comprising mainly CO, Ar and $CH_4$ are withdrawn; and
    second and third interconnected distillation zones, the second zone being located above the third zone in a single distillation column, at least portions of the overheads and bottoms streams from the first zone both being fed as feed streams to the distillation column, and a gaseous overheads product stream rich in $N_2$, an intermediate liquid stream product rich in CO, and a bottoms product stream rich in impurities, being withdrawn from the column.

6. A process according to claim 5, wherein a portion of the bottoms stream from the first zone is fed into the third zone, and wherein the second overheads stream from the first zone comprises mainly gaseous components, and the first overheads stream mainly condensate, the second overheads stream constituting the portion of the overheads stream from the first zone which is fed to the second zone of the column.

7. A process according to claim 6, wherein the cooling and partial condensation of the overheads stream from the first zone is effected by heat exchange with said part of the bottoms stream from the third zone.

8. A process according to claim 5, wherein the heating up of said at least part of the bottoms stream from the first zone is effected by heat exchange with the feed stream to the nitrogen wash zone, thereby to assist in cooling down the feed stream.

9. A process according to claim 1, wherein the distillation zones comprise
- a first distillation zone from which a gaseous overheads stream comprising mainly CO, $N_2$ and $H_2$, as well as a liquid bottoms product stream comprising mainly impurities, are withdrawn; and
- a second distillation zone to which at least a portion of the overheads stream from the first distillation zone is fed, a gaseous overheads product stream rich in $H_2$ and $N_2$, and a liquid bottoms product stream rich in CO being withdrawn from the second distillation zone.

10. A process according to claim 1, wherein the distillation zones comprise
- a first distillation zone from which a gaseous overheads product stream rich in $H_2$ and $N_2$, as well as a liquid bottoms stream rich in CO and impurities, are withdrawn, and
- a second distillation zone to which the bottoms stream from the first zone is fed, a gaseous overheads product stream rich in CO and a liquid bottoms product stream rich in impurities being withdrawn from the second distillation zone.

11. A gas treatment process which includes
passing a composite gas feed stream comprising $H_2$, $N_2$, CO and impurities such as Ar and, optionally, $CH_4$, at super-atmospheric pressure and at sub-ambient temperature into a nitrogen wash zone;

simultaneously introducing liquid nitrogen into the nitrogen wash zone;

withdrawing an $H_2$-rich stream from the nitrogen wash zone;

withdrawing a liquid tail product stream comprising $N_2$, CO, the impurities and some $H_2$ from the nitrogen wash zone;

separating at least a portion of the liquid tail product stream into a plurality of product streams in a plurality of cryogenic distillation zones, each product stream being rich in one or more of $H_2$, CO, $N_2$ and at least one impurity;

withdrawing from a first distillation zone a gaseous overheads stream;

withdrawing from a second distillation zone a liquid bottoms stream;

passing the overheads stream and the bottoms stream through a heat exchanger, thereby cooling down the gaseous overheads stream and at least partially condensing it, and simultaneously heating the bottoms stream and at least partially vapourizing it;

returning at least some of the condensate of the overheads stream to the first distillation zone as a reflux stream; and returning at least a portion of the vaporized bottoms stream to the second distillation zone as a reboil stream.

12. A gas treatment process which includes
passing a composite gas feed stream comprising $H_2$, $N_2$, CO and impurities such as Ar and, optionally, $CH_4$, at super-atmospheric pressure and at sub-ambient temperature into a nitrogen wash zone;

simultaneously introducing liquid nitrogen into the nitrogen wash zone;

withdrawing an $H_2$-rich stream from the nitrogen wash zone;

withdrawing a liquid tail product stream comprising $N_2$, CO, the impurities and some $H_2$ from the nitrogen wash zone;

feeding the liquid tail product stream into a flash zone which is at a lower pressure than the nitrogen wash zone;

withdrawing an $H_2$-rich stream from the flash zone;

withdrawing a liquid stream comprising $N_2$, CO, impurities and residual $H_2$ from the flash zone;

separating the liquid stream from the flash zone into a plurality of product streams in a plurality of cryogenic distillation zones, each product stream being rich in one or more of $H_2$, CO, $N_2$ and at least one impurity; and utilizing the liquid stream from the flash zone to cool down the feed stream prior to it entering the nitrogen wash zone.

* * * * *